(12) United States Patent
Kobayashi et al.

(10) Patent No.: US 10,895,188 B2
(45) Date of Patent: Jan. 19, 2021

(54) EXHAUST GAS PURIFIER

(71) Applicant: Yanmar Co., Ltd., Osaka (JP)

(72) Inventors: Ryota Kobayashi, Osaka (JP); Shunji Hamaoka, Osaka (JP); Tsuyoshi Inoue, Osaka (JP); Tetsuya Yokoyama, Osaka (JP); Yoshinori Fukui, Osaka (JP); Seita Akimoto, Osaka (JP); Kenya Onishi, Osaka (JP); Kazuki Hirai, Osaka (JP)

(73) Assignee: YANMAR POWER TECHNOLOGY CO., LTD., Osaka (JP)

( * ) Notice: Subject to any disclaimer, the term of this patent is extended or adjusted under 35 U.S.C. 154(b) by 0 days.

(21) Appl. No.: 16/480,290

(22) PCT Filed: Nov. 22, 2017

(86) PCT No.: PCT/JP2017/041938
§ 371 (c)(1),
(2) Date: Jul. 23, 2019

(87) PCT Pub. No.: WO2018/139023
PCT Pub. Date: Aug. 2, 2018

(65) Prior Publication Data
US 2020/0040789 A1    Feb. 6, 2020

(30) Foreign Application Priority Data
Jan. 27, 2017  (JP) ................. 2017-012895

(51) Int. Cl.
*F01N 3/20* (2006.01)
*B01D 53/94* (2006.01)
(Continued)

(52) U.S. Cl.
CPC .......... *F01N 3/2053* (2013.01); *B01D 53/94* (2013.01); *F01N 3/2892* (2013.01); *F01N 3/34* (2013.01); *F01N 13/08* (2013.01)

(58) Field of Classification Search
None
See application file for complete search history.

(56) References Cited

U.S. PATENT DOCUMENTS

2016/0237870 A1    8/2016  Yokoyama et al.
2018/0340458 A1*  11/2018  Kobayashi .......... F01N 13/0097

FOREIGN PATENT DOCUMENTS

JP    05-272334 A    10/1993
JP    08-135883 A     5/1996
(Continued)

OTHER PUBLICATIONS

Wakamatsu et al. JP2004270738A—translated document (Year: 2004).*

(Continued)

*Primary Examiner* — Jelitza M Perez
(74) *Attorney, Agent, or Firm* — Norton Rose Fulbright US LLP

(57) ABSTRACT

An exhaust gas purifier including a casing, SCR catalysts (comprising a first SCR catalyst and a second SCR catalyst), a first backflow prevention plate, and a second backflow prevention plate. In the casing, at least a part of the catalyst passage and at least a part of the bypass passage are formed. The SCR catalysts are disposed in the catalyst passage and selectively reduce NOx included in an exhaust gas flowing in the catalyst passage. The first backflow prevention plate prevents or reduces a backflow of an exhaust gas from a second exhaust passage to the catalyst passage.

17 Claims, 12 Drawing Sheets

(51) Int. Cl.
*F01N 3/28* (2006.01)
*F01N 3/34* (2006.01)
*F01N 13/08* (2010.01)

(56) References Cited

FOREIGN PATENT DOCUMENTS

| | | | |
|---|---|---|---|
| JP | 2004-270738 A | | 9/2004 |
| JP | 2004270738 A | * | 9/2004 |
| JP | 2015-086726 A | | 5/2015 |
| WO | 2015/056452 A1 | | 4/2015 |

OTHER PUBLICATIONS

International Search Report dated Aug. 2, 2018 issued in corresponding PCT Application PCT/JP2017/041938 cites the patent documents above.

* cited by examiner

← Exhaust gas flow in passing through catalyst passage

EXHAUST GAS PURIFIER

CROSS REFERENCES TO RELATED APPLICATIONS

This application is a national stage application pursuant to 35 U.S.C. 371 of International Application No. PCT/JP2017/041938, filed on Nov. 22, 2017 which claims priority under 35 U.S.C. § 119 to Japanese Patent Application No. 2017-012895 filed on Jan. 27, 2017, the disclosures of which are hereby incorporated by reference in their entireties.

TECHNICAL FIELD

The present invention mainly relates to an exhaust gas purifier for purifying nitrogen oxide (NOx) included in an exhaust gas.

BACKGROUND ART

An exhaust gas purifier known to date purifies NOx included in an exhaust gas by selective catalytic reduction (SCR). An exhaust gas purifier of this type includes a catalyst for use in selective catalytic reduction (hereinafter referred to as an SCR catalyst). NOx included in an exhaust gas is reduced by contact with the SCR catalyst to be changed into nitrogen and water. Accordingly, the amount of NOx emission can be reduced. Patent Literature 1 (PTL 1) discloses an exhaust gas purifier for performing selective catalytic reduction of this type.

The exhaust gas purifier of PTL 1 includes a main passage provided with an SCR catalyst, a bypass passage for bypassing the main passage, and a passage switching section for switching a flow of an exhaust gas between the main passage and the bypass passage. Operation of the passage switching section can switch selective catalytic reduction between on and off depending on environments and conditions. The exhaust gas purifier also includes a casing in which a part of the main passage and a part of the bypass passage are formed. The main passage and the bypass passage are joined at an exhaust downstream side.

CITATION LIST

Patent Literature

PTL1: Japanese Patent Application Laid-Open No. 2015-86726

SUMMARY OF INVENTION

Technical Problem

In PTL 1, a part of an exhaust gas that has flowed in the bypass passage flows back to the main passage from the junction portion between the main passage (catalyst passage) and the bypass passage in some cases. In this case, contact of the exhaust gas with the SCR catalyst in the main passage might degrade the SCR catalyst. In particular, in a configuration including a casing in which a main passage and a bypass passage are formed as described in PTL 1, a backflow of an exhaust gas might easily occur.

The present invention has been made in view of the foregoing circumstances, and a principal object of some aspects of the present invention is to provide an exhaust gas purifier including a casing in which a catalyst passage and a bypass passage are formed and capable of preventing or reducing a backflow of an exhaust gas that has passed through the bypass passage to the catalyst passage.

Solution to Problem and Advantages

Problems to be solved by some aspects of the present invention have been described above, and solutions for the problems and advantages of the solutions will be described below.

In an aspect of the present invention, an exhaust gas purifier having the following configuration is provided. Specifically, the exhaust gas purifier includes: a first exhaust passage in which an exhaust gas of an engine mounted on a ship flows; a catalyst passage that is a passage branched from the first exhaust passage and selectively reduces a nitrogen oxide included in the exhaust gas; a bypass passage that is a passage branched from the first exhaust passage and bypasses the catalyst passage; a second exhaust passage that is a passage in which the catalyst passage and the bypass passage are joined at an exhaust downstream side; a casing in which at least a part of the catalyst passage and at least a part of the bypass passage are formed; an SCR catalyst that is disposed in the catalyst passage and selectively reduces a nitrogen oxide included in an exhaust gas flowing in the catalyst passage; and a backflow prevention section that prevents or reduces a backflow of an exhaust gas from the second exhaust passage to the catalyst passage.

With this configuration, in the exhaust gas purifier including the casing in which the catalyst passage and the bypass passage are formed, a backflow of an exhaust gas that has flowed through the bypass passage to the catalyst passage can be prevented or reduced. Consequently, an exhaust gas that has flowed back does not easily flows into the SCR catalyst so that degradation of the SCR catalyst can be suppressed.

The exhaust gas purifier preferably has the following configuration. That is, the exhaust gas purifier preferably includes a first backflow prevention section as the backflow prevention section; and a second backflow prevention section. The second backflow prevention section is disposed between the SCR catalyst and the first backflow prevention section and prevents or reduces a backflow of an exhaust gas.

Accordingly, since two backflow prevention sections are disposed, a backflow of an exhaust gas from the second exhaust passage to the catalyst passage can be more reliably prevented. Thus, an exhaust gas that has flowed back does not easily flows into the SCR catalysts so that degradation of the SCR catalysts can be more reliably suppressed.

The exhaust gas purifier preferably has the following configuration. That is, preferably, the casing includes an inner wall portion separating the catalyst passage and the bypass passage from each other, and a catalyst outer wall portion separating the catalyst passage and outside from each other, at least one of the first backflow prevention section and the second backflow prevention section is disposed to connect the inner wall portion and the catalyst outer wall portion to each other and partially has an opening, and an opening ratio in the catalyst outer wall portion is smaller than an opening ratio in the inner wall portion.

With this configuration, the exhaust gas easily flows back along the catalyst outer wall portion, and thus, the smaller opening ratio in the catalyst outer wall portion can more reliably prevent a backflow of an exhaust gas.

The exhaust gas purifier preferably has the following configuration. That is, the exhaust gas purifier preferably includes a reducing agent injector that is disposed closer to an exhaust upstream side than the SCR catalyst is in the catalyst passage and injects a reducing agent for use in selective reduction of a nitrogen oxide included in an exhaust gas toward an exhaust downstream side together with compressed air. The reducing agent injector preferably injects compressed air in any of a case where an exhaust gas passes through the catalyst passage and a case where an exhaust gas passes through the bypass passage.

This configuration can prevent or reduce a backflow of an exhaust gas by using a flow of compressed air generated by injection of the reducing agent injector.

In the exhaust gas purifier, at least one of the first backflow prevention section and the second backflow prevention section is preferably a catalyst for preventing or reducing a backflow.

This configuration can prevent or reduce a backflow of an exhaust gas by using a catalyst.

In the exhaust gas purifier, at least one of the first backflow prevention section and the second backflow prevention section is preferably a catalyst passage inner pipe that is disposed in the catalyst passage and reduces a channel cross-sectional area of an exhaust gas that has passed through the SCR catalyst.

This configuration can prevent or reduce a backflow of an exhaust gas by the reduction of the channel cross-sectional area.

The exhaust gas purifier preferably has the following configuration. That is, preferably, the bypass passage has a passage connection opening through which the bypass passage and the catalyst passage are connected to each other to serve as the second exhaust passage, and the backflow prevention section is disposed at at least an edge of the passage connection opening at an exhaust upstream side and is an anti-backflow guide section that guides an exhaust gas flowing in the bypass passage such that the exhaust gas does not enter the passage connection opening.

With this configuration, the presence of the anti-backflow guide section prevents an exhaust gas flowing in the bypass passage from entering the passage connection opening, and thus, can prevent or reduce a backflow of the exhaust gas.

In the exhaust gas purifier, the backflow prevention section is preferably a compressed air injector that is disposed closer to an exhaust downstream side than the SCR catalyst is in the catalyst passage and that injects, toward the exhaust downstream side, compressed air for preventing or reducing a backflow of an exhaust gas from the second exhaust passage to the catalyst passage.

With this configuration, a flow from the catalyst passage to the second exhaust passage can be generated by injecting compressed air, and thus, a backflow of an exhaust gas can be prevented or reduced.

The exhaust gas purifier preferably has the following configuration. That is, preferably, the backflow prevention section is a reduced-diameter section that is formed in an end portion of the bypass passage at an exhaust downstream side and prevents or reduces a backflow of an exhaust gas from the second exhaust passage to the catalyst passage, and a channel cross-sectional area of an end portion of the reduced-diameter section at the exhaust downstream side is smaller than a channel cross-sectional area of an end portion of the reduced-diameter section at an exhaust upstream side.

With this configuration, since the pressure of an exhaust gas is low in an end portion of the bypass passage at the exhaust downstream side (i.e., near a portion joined with the catalyst passage), a flow from the catalyst passage to the second exhaust passage occurs. Thus, a backflow of an exhaust gas can be prevented or reduced.

The exhaust gas purifier preferably has the following configuration. That is, preferably, the backflow prevention section is a double pipe that is disposed at end portions of the catalyst passage and the bypass passage at an exhaust downstream side and is configured to prevent or reduce a backflow of an exhaust gas from the second exhaust passage to the catalyst passage, the catalyst passage is an inner tube, and the bypass passage is an outer tube covering an outer side of the inner tube.

With this configuration, an exhaust gas flowing in the bypass passage does not reach the catalyst passage without a significant change of a traveling passage. Thus, a backflow of the exhaust gas can be prevented or reduced. In addition, in the double pipe, although a backflow from the inner tube through the outer tube might occur in an end portion of the inner tube (i.e., a junction portion between the catalyst passage and the bypass passage), since the bypass passage is constituted by the outer tube in the above configuration, a backflow of an exhaust gas from the bypass passage to the catalyst passage can be more reliably prevented.

The exhaust gas purifier preferably has the following configuration. That is, preferably, the backflow prevention section is a double pipe that is disposed at end portions of the catalyst passage and the bypass passage at an exhaust downstream side and is configured to prevent or reduce a backflow of an exhaust gas from the second exhaust passage to the catalyst passage, the bypass passage is an inner tube, and the catalyst passage is an outer tube covering an outer side of the inner tube.

With this configuration, an exhaust gas flowing in the bypass passage does not reach the catalyst passage without a significant change of a traveling passage. Thus, a backflow of an exhaust gas can be prevented or reduced.

The exhaust gas purifier preferably has the following configuration. That is, preferably, the casing includes an inner wall portion separating the catalyst passage and the bypass passage from each other, and a catalyst outer wall portion separating the catalyst passage and outside from each other, the backflow prevention section is disposed to connect the inner wall portion and the catalyst outer wall portion to each other and partially has an opening, and in at least a part of the opening, an opening area of an end portion at an exhaust downstream side is smaller than an opening area of an end portion at an exhaust upstream side.

With this configuration, the opening area of the end portion at the exhaust downstream side is smaller than that of the end portion at the exhaust upstream side so that the exhaust gas is less likely to pass through the backflow prevention section from the exhaust downstream side to the exhaust upstream side. Thus, a backflow of the exhaust gas can be prevented or reduced.

In the exhaust gas purifier, the backflow prevention section preferably includes three or more backflow prevention sections.

With this configuration, even in a case where an exhaust gas that has flowed back passes through any backflow prevention section, the exhaust gas does not reach the SCR catalyst unless the exhaust gas passes through the other plurality of backflow prevention sections. Thus, degradation of the SCR catalyst due to a backflow of an exhaust gas can be more reliably prevented or reduced.

DESCRIPTION OF EMBODIMENTS

Figure 1:
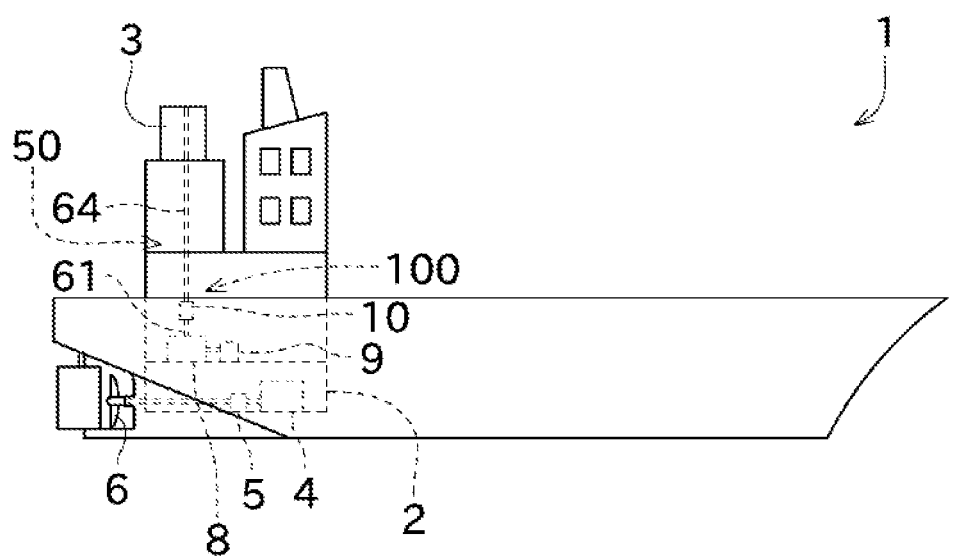
FIG. 1 is a schematic side view of a ship on which an exhaust gas purifier according to each embodiment is mounted.

Embodiments of the present invention will be described with reference to the drawings. First, with reference to FIG. 1, a ship 1 on which an exhaust gas purifier 100 according to each embodiment is mounted will be described. FIG. 1 is a schematic side view of the ship 1. In the following description, terms for describing positional relationships, sizes, or shapes, for example, refer not only to a configuration for which meanings of the terms are completely established but also to a configuration for which meanings of the terms are substantially established.

As illustrated in FIG. 1, the ship 1 includes an engine room 2, a funnel 3 for emitting an exhaust gas generated in the engine room 2, and a propulsive device 6 that generates a propulsive force for moving the ship 1. The engine room 2 is disposed inside a body of the ship 1. The engine room 2 houses a propulsive engine 4, a speed reducer 5, a power generation engine 8, and a power generation device 9.

The propulsive engine 4 is a diesel engine that generates a drive force for moving the ship 1. The driving force generated by the propulsive engine 4 is subjected to speed reduction to a predetermined rotation speed by the speed reducer 5, and then transferred to the propulsive device 6 (specifically a rotation shaft of a screw).

The power generation engine 8 is a diesel engine that generates a drive force for generating power in the ship. The power generation device 9 generates power by using the drive force generated by the power generation engine 8. An exhaust gas generated in the power generation engine 8 is emitted to the outside from the funnel 3 through an exhaust passage 50. The exhaust passage 50 is provided with the exhaust gas purifier 100. The exhaust gas purifier 100 is capable of purifying NOx included in an exhaust gas generated by the power generation engine 8, through selective catalytic reduction.

One power generation engine 8 may be mounted on the ship 1, or a plurality of power generation engines 8 may be mounted on the ship 1. In the case where the plurality of power generation engines 8 are mounted, the exhaust passage 50 is provided for each power generation engine 8, but the plurality of power generation engines 8 may share one exhaust passage 50. The exhaust gas purifier 100 described below is connected to the power generation engine 8, and an exhaust gas purifier connected to the propulsive engine 4 can also employ a configuration similar to that of the exhaust gas purifier 100.

Figure 2:
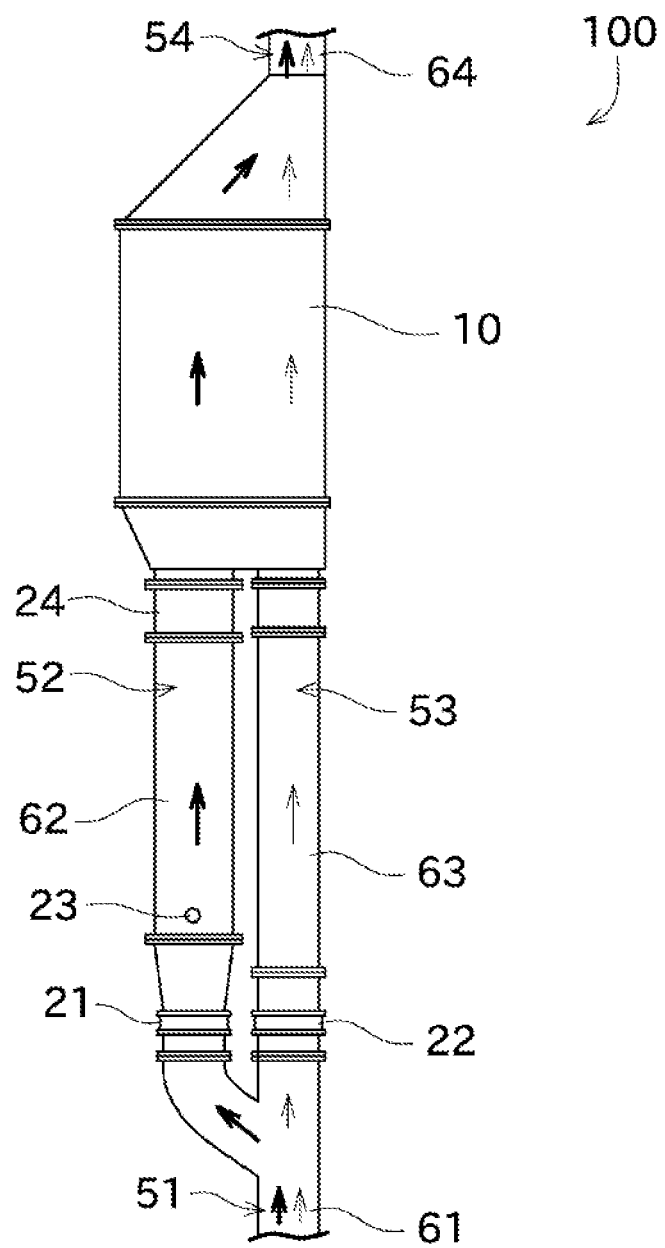
FIG. 2 is an outline view of an exhaust gas purifier according to a first embodiment.
Figure 3:
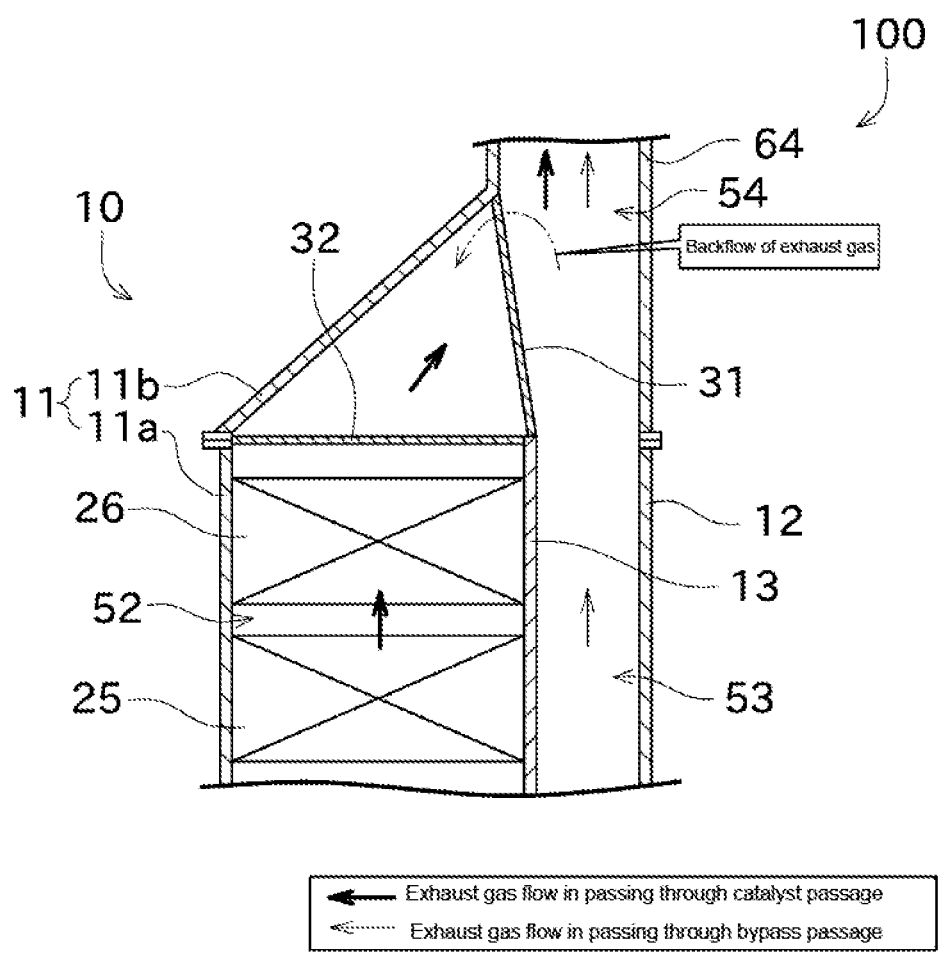
FIG. 3 is a cross-sectional view of a casing and a vicinity thereof.
Figure 4:
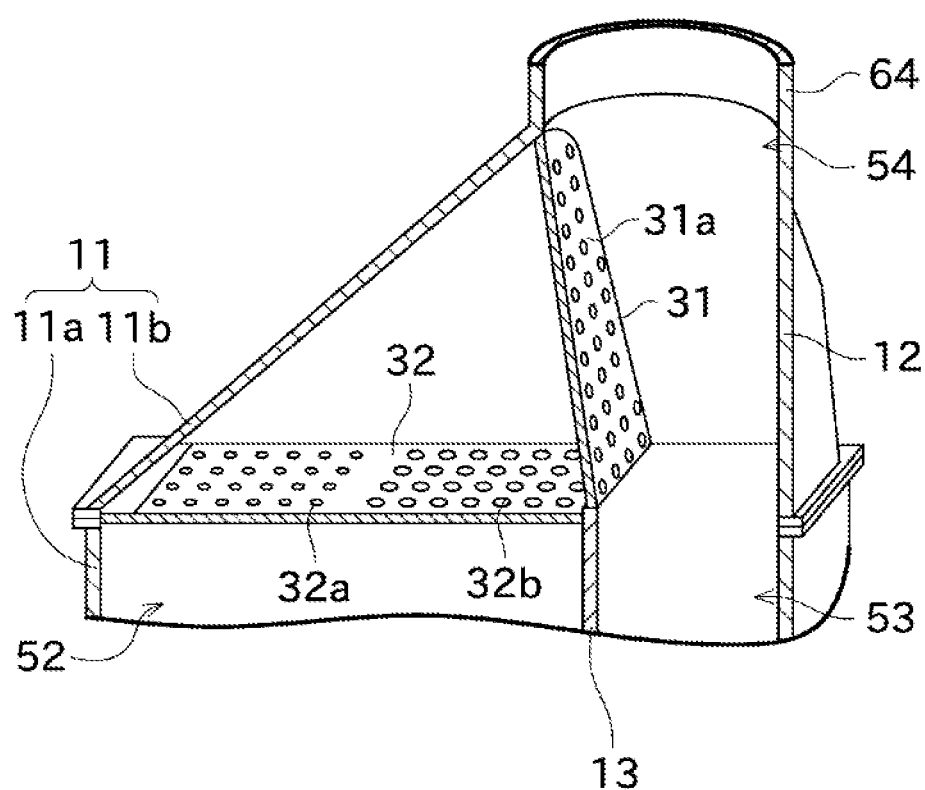
FIG. 4 is a cross-sectional perspective view of a junction portion between a catalyst passage and a bypass passage and a vicinity thereof.

Next, with reference to FIGS. 2 through 4, the exhaust gas purifier 100 according to a first embodiment will be described in detail. FIG. 2 is an outline view of the exhaust gas purifier 100. FIG. 3 is a cross-sectional view of a casing 10 and a vicinity thereof. FIG. 4 is a cross-sectional perspective view of a vicinity of a junction portion between a catalyst passage 52 and a bypass passage 53. In the following description, an upstream side in a flow of an exhaust gas generated by the power generation engine 8 before emission to the outside (excluding a backflow of the exhaust gas) will be referred to as an "exhaust upstream side" and a downstream side of this flow of the exhaust gas will be referred to as an "exhaust downstream side."

As illustrated in FIGS. 2 and 3, the exhaust gas purifier 100 includes a first exhaust passage 51, a catalyst passage 52, a bypass passage 53, and a second exhaust passage 54. The first exhaust passage 51, either the catalyst passage 52 or the bypass passage 53, and the second exhaust passage 54 are arranged in this order from the exhaust upstream side. With respect to an exhaust gas generated by the power generation engine 8, the exhaust gas purifier 100 is switchable between a configuration for emitting the exhaust gas through selective catalytic reduction and a configuration for emitting the exhaust gas without selective catalytic reduction. In the case of performing selective catalytic reduction in the exhaust gas purifier 100, an exhaust gas generated by the power generation engine 8 flows in the first exhaust passage 51, the catalyst passage 52, and the second exhaust passage 54 in this order. On the other hand, in the case of performing no selective catalytic reduction in the exhaust gas purifier 100, the exhaust gas generated by the power generation engine 8 flows in the first exhaust passage 51, the bypass passage 53, and the second exhaust passage 54 in this order. The passages will now be described specifically.

The first exhaust passage 51 is a passage in which an exhaust gas generated by the power generation engine 8 flows. The first exhaust passage 51 is a passage in which the exhaust gas flows in both the case of performing selective catalytic reduction and the case of performing no selective catalytic reduction in the exhaust gas purifier 100. The first exhaust passage 51 branches into the catalyst passage 52 and the bypass passage 53 in an end portion at the exhaust downstream side. The first exhaust passage 51 is specifically constituted by a first exhaust pipe 61.

The catalyst passage 52 is a passage in which an exhaust gas flows in the case of performing selective catalytic reduction and a passage in which no exhaust gas flows in the case of performing no selective catalytic reduction in the exhaust gas purifier 100. The catalyst passage 52 is specifically constituted by a catalyst passage pipe 62 and a part of the casing 10 (described in detail later). As illustrated in FIGS. 2 and 3, the catalyst passage 52 is provided with a catalyst passage valve 21, a urea water injector (reducing agent injector) 23, an exhaust mixer 24, a first SCR catalyst (SCR catalyst) 25, and a second SCR catalyst (SCR catalyst) 26, that are arranged in this order from the exhaust upstream side.

The catalyst passage valve 21 is disposed in the catalyst passage pipe 62 (specifically an end of the catalyst passage pipe 62 at the exhaust upstream side). The catalyst passage valve 21 is switchable between a state in which the catalyst passage pipe 62 is closed not to flow the exhaust gas (closed state) and a state in which the catalyst passage pipe 62 is made open to flow the exhaust gas (open state). The catalyst passage valve 21 is switched between these states by an operation of an actuator for valve operation based on a signal from an unillustrated control section. The catalyst passage valve 21 is controlled to be in the open state in the case of performing selective catalytic reduction in the exhaust gas purifier 100 and to be in the closed state in the case of performing no selective catalytic reduction in the exhaust gas purifier 100.

The urea water injector 23 is disposed in the catalyst passage pipe 62. The urea water injector 23 is configured to inject urea water as a reducing agent toward the exhaust downstream side together with compressed air. The urea water injector 23 is capable of injecting compressed air only. When exposed to a high-temperature exhaust gas, urea included in urea water is changed to ammonia through thermal decomposition and hydrolysis (see reaction formulas (1) and (2) below).

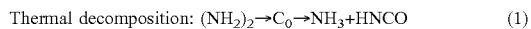

Thermal decomposition: $(NH_2)_2 \rightarrow C_0 \rightarrow NH_3 + HNCO$ (1)

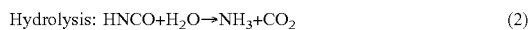

Hydrolysis: $HNCO + H_2O \rightarrow NH_3 + CO_2$ (2)

The exhaust mixer 24 is disposed in the catalyst passage pipe 62 (specifically an end portion of the catalyst passage pipe 62 at the exhaust downstream side). The exhaust mixer 24 generates a swirl flow about a direction in which an exhaust gas flows with respect to a mixture of the exhaust gas and urea water to thereby mix the exhaust gas and urea water. In this embodiment, a channel cross-sectional area where the catalyst passage 52 of the casing 10 is formed is larger than a channel cross-sectional area of the catalyst passage pipe 62. However, since the exhaust mixer 24 generates the swirl flow in the exhaust gas, the exhaust gas expands radially. Accordingly, the exhaust gas flows to a radial end of a portion of the casing 10 where the catalyst passage 52 is formed.

The first SCR catalyst 25 and the second SCR catalyst 26 are disposed in the casing 10. The first SCR catalyst 25 and the second SCR catalyst 26 are catalysts for use in selective catalytic reduction, specifically, is made of a material such as zeolite or ceramic that adsorbs ammonia. Each of the first SCR catalyst 25 and the second SCR catalyst 26 has a honeycomb structure constituted by porous walls. Ammonia generated by injection of urea water from the urea water injector 23 is adsorbed by the first SCR catalyst 25 and the second SCR catalyst 26. NOx included in an exhaust gas contacts the first SCR catalyst 25 and the second SCR catalyst 26 that have adsorbed ammonia to be thereby reduced, and changed into nitrogen and water (see reaction formula (3) below). Each of the first SCR catalyst 25 and the second SCR catalyst 26 has the function of reducing emission of ammonia to the outside in the case of excessive generation of ammonia (see reaction formula (4) below).

$NO + NO_2 + 2NH_3 \rightarrow 2N_2 + 3H_2O$ (3)

$4NH_3 + 3O_2 \rightarrow 2N_2 + 6H_2O$ (4)

The bypass passage 53 is a passage in which an exhaust gas flows instead of the catalyst passage 52 (bypasses the catalyst passage 52) in the case of performing no selective catalytic reduction, and a passage in which no exhaust gas flows in the case of performing selective catalytic reduction in the exhaust gas purifier 100. The catalyst passage 52 is specifically constituted by the bypass passage pipe 63 and a part of the casing 10 (described in detail later). As illustrated in FIGS. 2 and 3, the bypass passage pipe 63 is provided with a bypass passage valve 22.

The bypass passage valve 22 is disposed in the bypass passage pipe 63 (specifically an end of the bypass passage pipe 63 at the exhaust upstream side). The bypass passage valve 22 is switchable between a state in which the bypass passage pipe 63 is closed not to flow the exhaust gas (closed state) and a state in which the bypass passage pipe 63 is made open to flow the exhaust gas (open state). The bypass passage valve 22 is switched between these states by an operation of an actuator for valve operation based on a signal from an unillustrated control section. The bypass passage valve 22 is controlled to be in the closed state in the case of performing selective catalytic reduction in the exhaust gas purifier 100 and to be in the open state in the case of performing no selective catalytic reduction in the exhaust gas purifier 100.

The second exhaust passage 54 is a passage in which the catalyst passage 52 and the bypass passage 53 are joined at the exhaust downstream side. Thus, the second exhaust passage 54 is a passage in which an exhaust gas flows in both the case of performing selective catalytic reduction and the case of performing no selective catalytic reduction in the exhaust gas purifier 100. In this embodiment, the catalyst passage 52 and the bypass passage 53 are joined in such a manner that the catalyst passage 52 is connected to the bypass passage 53. Alternatively, the catalyst passage 52 and the bypass passage 53 may be joined in such a manner that the bypass passage 53 is connected to the catalyst passage 52. The exhaust gas that has passed through the second exhaust passage 54 is emitted to the outside through the funnel 3 described above. The second exhaust passage 54 is specifically constituted by a second exhaust pipe 64. The first exhaust passage 51 through the second exhaust passage 54 may be formed by using members not described above.

Next, with reference to FIG. 3, the catalyst passage pipe 62 and the bypass passage pipe 63 formed in the casing 10 will be described. As illustrated in FIG. 3, the casing 10 includes a catalyst outer wall portion 11, a bypass outer wall portion 12, and an inner wall portion 13. The catalyst outer wall portion 11 constitutes an outer wall of the casing 10, and separates the catalyst passage 52 from the outside (portions except for the exhaust passage 50). The catalyst outer wall portion 11 includes a main outer wall portion 11a and a connection outer wall portion 11b. The main outer wall portion 11a is substantially in parallel with the inner wall portion 13, and extends along the longitudinal direction of the catalyst passage pipe 62. In a portion where the main outer wall portion 11a is formed, the first SCR catalyst 25 and the second SCR catalyst 26 are disposed. The connection outer wall portion 11b is a portion that tilts toward the bypass passage 53 so as to cause the catalyst passage 52 to approach the bypass passage 53. The bypass outer wall portion 12 constitutes the outer wall of the casing 10, and separates the bypass passage 53 from the outside (portions except for the exhaust passage 50). The inner wall portion 13 is a wall portion formed inside the casing 10, and separates the catalyst passage 52 and the bypass passage 53 from each other.

In the configuration described above, the catalyst passage 52 includes a passage constituted by the main outer wall portion 11a and the inner wall portion 13 (substantially linear passage) and a passage constituted only by the connection outer wall portion 11b (bent or curved passage). The bypass passage 53 includes a passage constituted by the bypass outer wall portion 12 and the inner wall portion 13 (substantially linear passage).

Then, with reference to FIGS. 3 and 4, a configuration for preventing or reducing a backflow of an exhaust gas from the second exhaust passage 54 to the catalyst passage 52 will be described. FIG. 4 is a cross-sectional perspective view of a vicinity of a junction portion between the catalyst passage 52 and the bypass passage 53.

In a case where an exhaust gas passes through the bypass passage, as indicated by a chain line in FIG. 3, a part of the exhaust gas might flow back from the second exhaust passage 54 to the catalyst passage 52. The backflow of the exhaust gas is likely to occur along the connection outer wall portion 11b, but might occur in the inner side of the connection outer wall portion 11b. In the case of backflow of the exhaust gas, the exhaust gas including a sulfur component and a product derived from the sulfur component contacts the first SCR catalyst 25 and the second SCR catalyst 26, for example. Thus, the first SCR catalyst 25 and the second SCR catalyst 26, for example, degrade (sulfur poisoning).

In the first embodiment, as backflow prevention sections for preventing or reducing the backflow of an exhaust gas, a first backflow prevention plate (first backflow prevention section) 31 and a second backflow prevention plate (second backflow prevention section) 32 are disposed. The first backflow prevention plate 31 and the second backflow prevention plate 32 are porous plates having a plurality of openings (perforated metal).

The first backflow prevention plate 31 is disposed to connect an end portion of the connection outer wall portion 11b at the exhaust downstream side and an end portion of the inner wall portion 13 at the exhaust downstream side. The end portion of the connection outer wall portion 11b at the exhaust downstream side can also be expressed as a portion between the connection outer wall portion 11b and the second exhaust pipe 64. The first backflow prevention plate 31 is disposed between the second exhaust passage 54 and the first SCR catalyst 25 (second SCR catalyst 26). The first backflow prevention plate 31 is formed to completely cover the boundary between the catalyst passage 52 and the second exhaust passage 54 (passage connection opening).

The first backflow prevention plate 31 has a plurality of openings 31a. The openings 31a are through holes each having a circular cross section, and are formed uniformly in the entire first backflow prevention plate 31. An exhaust gas that has flowed along the catalyst passage 52 can pass through the openings 31a of the first backflow prevention plate 31. Accordingly, since the catalyst passage 52 and the bypass passage 53 are joined at the right of the first backflow prevention plate 31 in FIG. 3, this portion corresponds to the second exhaust passage 54.

The presence of the first backflow prevention plate 31 can receive a part of the exhaust gas flowing back from the second exhaust passage 54 to the catalyst passage 52, and thus, a backflow of the exhaust gas can be prevented or reduced (backflow ratio can be reduced).

The second backflow prevention plate 32 is disposed to connect an end portion of the connection outer wall portion 11b at the exhaust upstream side and the end portion of the inner wall portion 13 at the exhaust downstream side. The end portion of the connection outer wall portion 11b at the exhaust upstream side can also be expressed as an end portion of the main outer wall portion 11a at the exhaust downstream side or a portion between the main outer wall portion 11a and the connection outer wall portion 11b. The second backflow prevention plate 32 is disposed between the first backflow prevention plate 31 and the second SCR catalyst 26. The second backflow prevention plate 32 is formed to completely cover the catalyst passage 52 at the boundary between the main outer wall portion 11a and the connection outer wall portion 11b.

The second backflow prevention plate 32 has a plurality of small openings 32a and a plurality of large openings 32b. The small openings 32a are closer to the catalyst outer wall portion 11 than the center of the second backflow prevention plate 32 is. The large openings 32b are closer to the inner wall portion 13 than the center of the second backflow prevention plate 32 is. The small openings 32a and the large openings 32b are through holes each having a circular cross section. Each of the small openings 32a has a diameter smaller than that of the large openings 32b. The distance (pitch) between openings is the same in the small openings 32a and the large openings 32b. Accordingly, an opening ratio (a ratio of the area of openings per a predetermined area (unit area)) of the small openings 32a is smaller than that of the large openings 32b.

As described above, a backflow of an exhaust gas easily occurs along the catalyst outer wall portion 11. Thus, the configuration in which the opening ratio in the catalyst outer wall portion 11 of the second backflow prevention plate 32 is smaller than that in the inner wall portion 13 can ease reception of backflow of the exhaust gas, thereby further reliably preventing or reducing a backflow of the exhaust gas.

In this embodiment, the openings of the second backflow prevention plate 32 have different diameters so that the opening ratio is made different. Instead of this configuration, the distance between the openings (i.e., the number of openings per a predetermined area) may be made different so that the opening ratio is made different. Alternatively, both the diameter of the openings and the distance between the openings may be made different. In addition, in this embodiment, the second backflow prevention plate 32 has two types of opening ratios (the small openings 32a and the large openings 32b). Alternatively, the second backflow prevention plate 32 may be configured such that the opening ratio gradually changes (e.g., the opening ratio gradually decreases toward the catalyst outer wall portion 11).

The first backflow prevention plate 31 has a uniform opening ratio, but may be configured such that the opening ratio near the catalyst outer wall portion 11 may be lower than those in other portions, as in the second backflow prevention plate 32. In this case, only the opening ratio in the first backflow prevention plate 31 may vary, or both the opening ratios in the first backflow prevention plate 31 and the second backflow prevention plate 32 may vary.

The first backflow prevention plate 31 and the second backflow prevention plate 32 may be disposed at any locations, and may be disposed at locations different from those described above as long as the first backflow prevention plate 31 and the second backflow prevention plate 32 are at the exhaust downstream side of the second SCR catalyst 26. For example, an intermediate portion of the connection outer wall portion 11b and an end portion of the inner wall portion 13 at the exhaust downstream side may be connected to each other, or intermediate portions of the main outer wall portion 11a and the inner wall portion 13 may be connected to each other. Although each of the first backflow prevention plate 31 and the second backflow prevention plate 32 has a plate shape, each of them may have a shape (block shape) thicker than a typical plate member as long as openings are formed.

In this embodiment, in addition to the first backflow prevention plate 31 and the second backflow prevention plate 32, the urea water injector 23 also prevent or reduce a backflow of an exhaust gas. This will be specifically described below. As described above, in a case where an exhaust gas flows in the catalyst passage 52, the urea water injector 23 injects urea water and compressed air toward the exhaust downstream side. Thus, compressed air injected by the urea water injector 23 generates a flow from the catalyst passage 52 toward the second exhaust passage 54. Thus, this flow can prevent or reduce a backflow of an exhaust gas so that the urea water injector 23 injects compressed air even in the case where the exhaust gas flows in the bypass passage 53 in this embodiment. In the case where the exhaust gas flows in the bypass passage 53, since no selective reduction by the first SCR catalyst 25 and the second SCR catalyst 26 is performed, injection of urea water is unnecessary. Thus, the urea water injector 23 injects only compressed air.

In this embodiment, the flow rate of compressed air injected by the urea water injector 23 (injection flow rate) in the case where an exhaust gas flows in the bypass passage 53 is higher than the injection flow rate of the urea water injector 23 in a case where an exhaust gas flows in the catalyst passage 52. This configuration can more reliably prevent a backflow of the exhaust gas. The injection flow rate may be the same between the case where the exhaust gas flows in the catalyst passage 52 and the case where the exhaust gas flows in the bypass passage 53. The injection flow rate in the case where the exhaust gas flows in the catalyst passage 52 may be larger than that in the case where the exhaust gas flows in the bypass passage 53.

Figure 5:
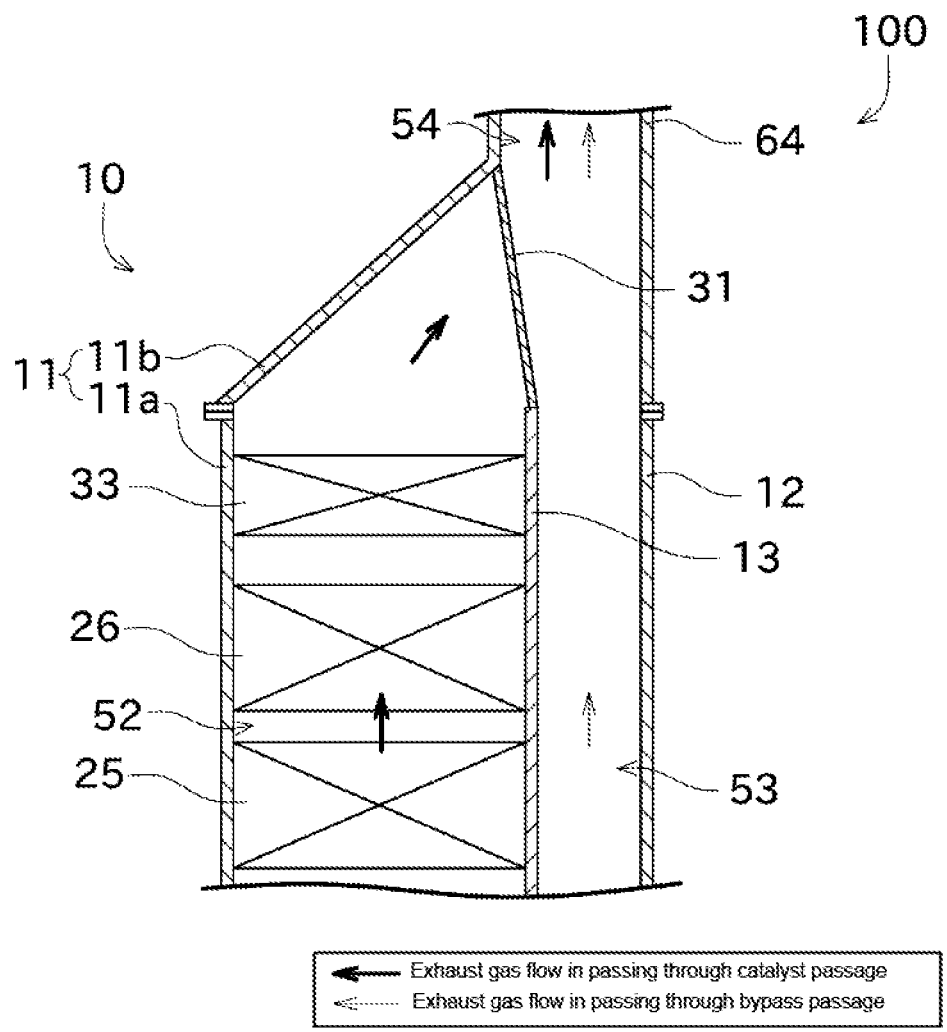
FIG. 5 is a cross-sectional view of a casing according to a second embodiment and a vicinity thereof.

Next, a second embodiment will be described with reference to FIG. 5. FIG. 5 is a cross-sectional view of a casing 10 according to the second embodiment and a vicinity thereof. In descriptions of second and subsequent embodiments, parts that are identical or similar to those of the first embodiment are given identical reference numerals in the drawings, and description of these parts may be omitted.

An exhaust gas purifier 100 according to the second embodiment includes an anti-backflow catalyst (backflow prevention section) 33 instead of the second backflow prevention plate 32 of the first embodiment. The anti-backflow catalyst 33 has the same configuration as that of the first SCR catalyst 25 and the second SCR catalyst 26. Accordingly, the anti-backflow catalyst 33 has a honeycomb structure, and thus, can prevent or reduce a backflow of an exhaust gas, in the same manner as the first backflow prevention plate 31, for example. The anti-backflow catalyst 33 is provided not to reduce NOx but to prevent or reduce a backflow of an exhaust gas, and thus, might be degraded by a backflow of an exhaust gas. Thus, in obtaining the amount of NOx emission by calculation, for example, the capacity of the anti-backflow catalyst 33 is not taken into consideration.

In this embodiment, the anti-backflow catalyst 33 is made of the same material and has the same shape as those of the first SCR catalyst 25 and the second SCR catalyst 26, but may be made of different material and have a different shape. For the anti-backflow catalyst 33, a material typically used as a catalyst is used for prevention or reduction of a backflow of an exhaust gas. Thus, the anti-backflow catalyst 33 does not need to have a function as a catalyst to an exhaust gas.

In the second embodiment, the anti-backflow catalyst 33 is used as the second backflow prevention section. Alternatively, the anti-backflow catalyst 33 may be used as the first backflow prevention section. In this case, a perforated metal as the second backflow prevention section, for example, is disposed at the exhaust upstream side of the anti-backflow catalyst 33.

Figure 6:
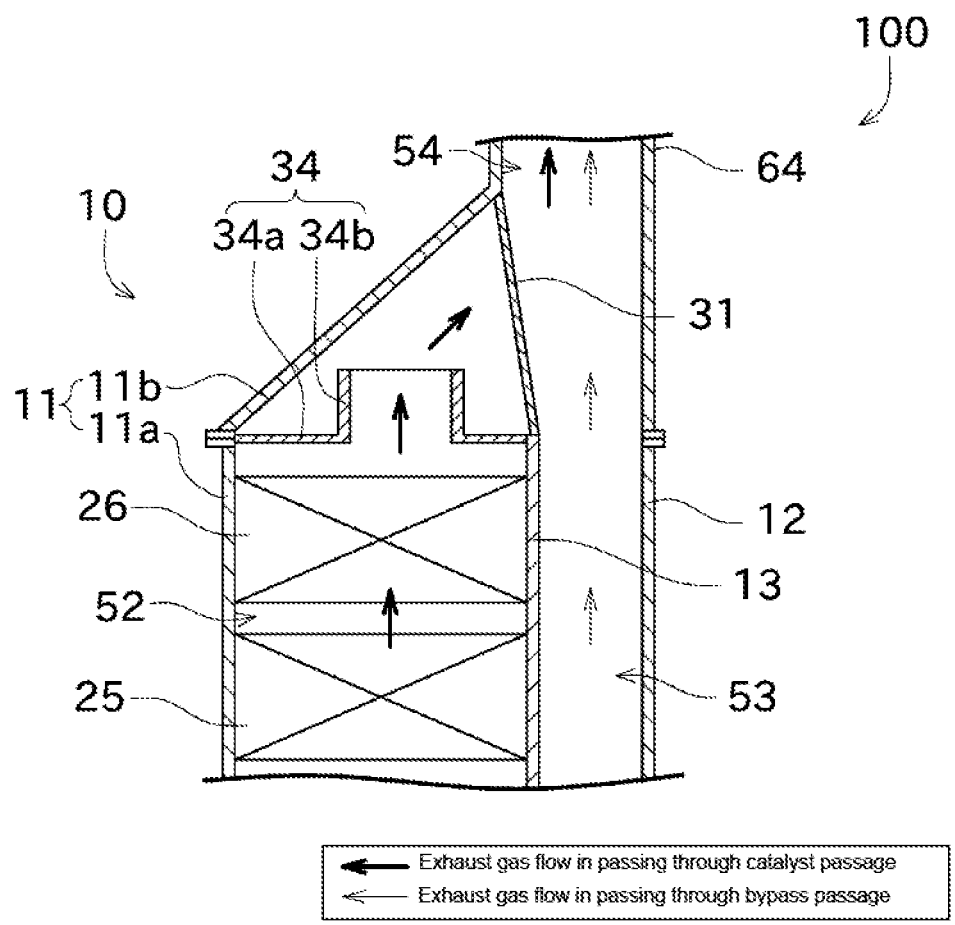
FIG. 6 is a cross-sectional view of a casing according to a third embodiment and a vicinity thereof.

Next, a third embodiment will be described with reference to FIG. 6. FIG. 6 is a cross-sectional view of a casing 10 according to a third embodiment and a vicinity thereof.

An exhaust gas purifier 100 according to the third embodiment includes a catalyst passage inner pipe (backflow prevention section) 34 instead of the second backflow prevention plate 32 of the first embodiment. The catalyst passage inner pipe 34 includes a closing plate 34a and a pipe portion 34b. The closing plate 34a closes a catalyst passage 52 in an end portion of a main outer wall portion 11a at the exhaust downstream side. The pipe portion 34b is a pipe projecting from substantially the center of the closing plate 34a (position except for an end toward a connection outer wall portion 11b) toward the exhaust downstream side.

The presence of the catalyst passage inner pipe 34 reduces a channel cross-sectional area of a catalyst passage 52 to thereby prevent or reduce a backflow of an exhaust gas. In particular, since the pipe portion 34b is formed at a position except for the end toward the connection outer wall portion 11b where a backflow of an exhaust gas is likely to occur, a backflow of the exhaust gas can be more reliably prevented or reduced. In addition, since the pipe portion 34b projects to the exhaust downstream side, a flow of an exhaust gas that has flowed back along the closing plate 34a, for example, toward the second SCR catalyst 26 can be prevented or reduced.

In the third embodiment, the catalyst passage inner pipe 34 is used as the second backflow prevention section. Alternatively, the catalyst passage inner pipe 34 may be used as the first backflow prevention section. In this case, a perforated metal as the second backflow prevention section, for example, is disposed at the exhaust upstream side of the catalyst passage inner pipe 34.

Figure 7A:
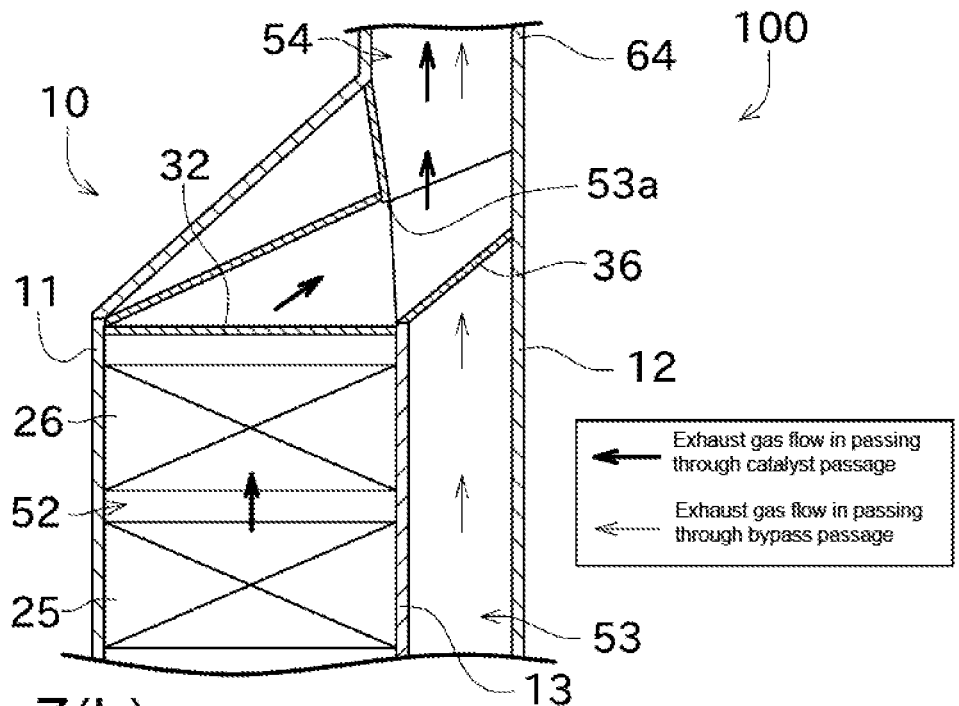
FIG. 7(a) and FIG. 7(b) are views of a casing according to a fourth embodiment and a vicinity thereof.
Figure 7B:
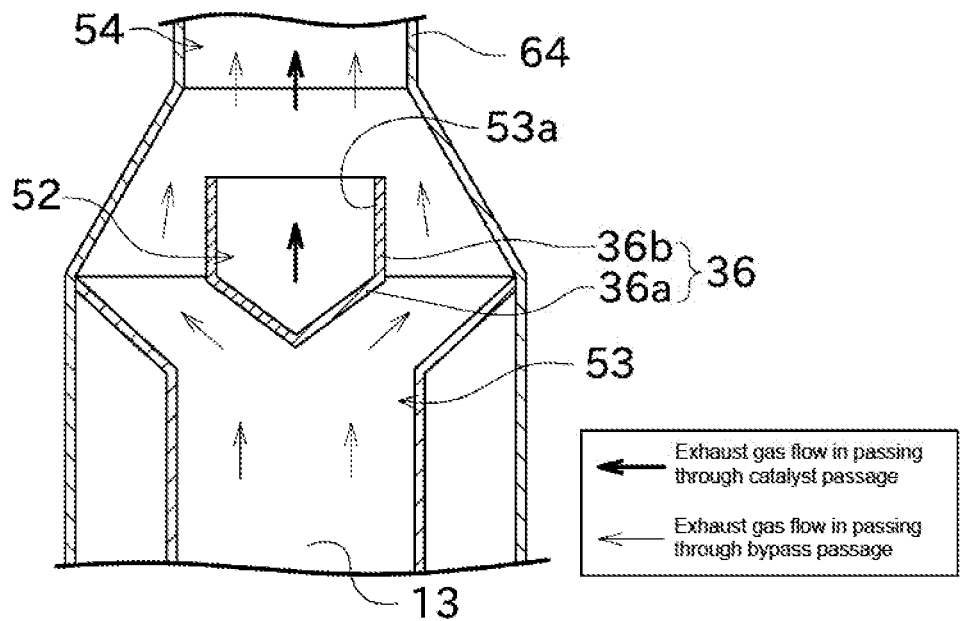

Next, a fourth embodiment will be described with reference to FIGS. 7(a) and 7(b). FIG. 7(a) is a side cross-sectional view of a casing 10 in which a catalyst passage 52 and a bypass passage 53 are formed. FIG. 7(b) is a side cross-sectional view of the casing 10 in which a bypass passage 53 is formed.

In the fourth embodiment, the catalyst passage 52 and the bypass passage 53 are different from those of the first embodiment. In the fourth embodiment, an anti-backflow guide section (backflow prevention section) 36 is used instead of the first backflow prevention plate 31 of the first embodiment to prevent or reduce a backflow of an exhaust gas. In the fourth embodiment, the passage connection opening 53a is formed in the bypass passage 53. The catalyst passage 52 and the bypass passage 53 are joined by the passage connection opening 53a to serve as a second exhaust passage 54. As illustrated in FIG. 7(b), the passage connection opening 53a is formed at a location except for a radial end portion of the bypass passage 53.

The anti-backflow guide section 36 is disposed at an end portion of the passage connection opening 53a (specifically an end portion except for an end portion at the exhaust downstream side). The anti-backflow guide section 36 includes a branched portion 36a and a guide portion 36b. The branched portion 36a is a portion constituting an end portion at the exhaust upstream side, and has a tapered shape whose width increases toward the exhaust downstream side. The branched portion 36a can branch an exhaust gas flowing in the bypass passage 53. The guide portion 36b is connected to an end portion of the branched portion 36a at the exhaust downstream side and extends in parallel with the longitudinal direction of the second exhaust pipe 64, for example. The guide portion 36b prevents or reduces a backflow in which an exhaust gas branched by the branched portion 36a flows into the passage connection opening 53a.

With this configuration, the exhaust gas flowing in the bypass passage 53 does not flow into the catalyst passage 52 without a significant change (about 180 degrees) of a traveling passage. In addition, since the passage connection opening 53a is formed at a position except for a radial end portion, the exhaust gas does not flow into the catalyst passage 52 along the outer wall, either. Accordingly, it is possible to further reliably prevent a backflow of an exhaust gas.

In the fourth embodiment, the anti-backflow guide section 36 is used as the second backflow prevention section. Alternatively, the anti-backflow guide section 36 may be used as the first backflow prevention section. The anti-backflow guide section 36 may be used alone (without any other backflow prevention section).

Figure 8:
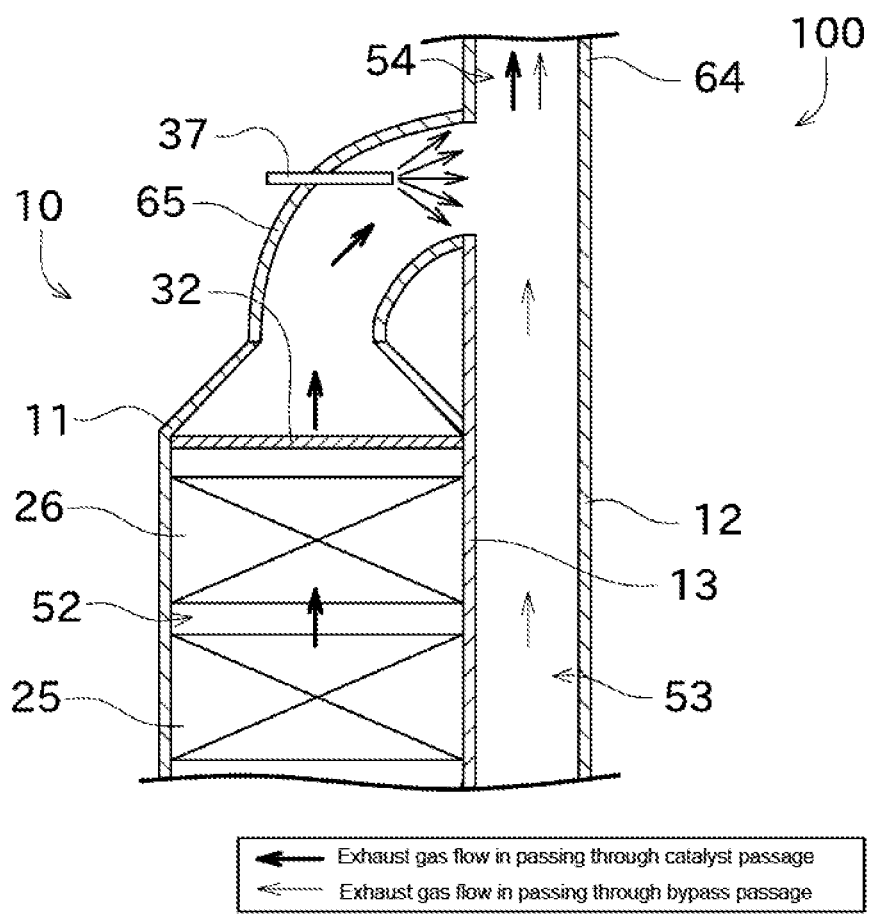
FIG. 8 is a cross-sectional view of a casing according to a fifth embodiment and a vicinity thereof.

Next, a fifth embodiment will be described with reference to FIG. 8. FIG. 8 is a cross-sectional view of a casing 10 according to the fifth embodiment and a vicinity thereof.

An exhaust gas purifier 100 according to the fifth embodiment is different from that of the first embodiment in that a catalyst outer wall portion 11 is not directly connected to a second exhaust pipe 64 but is connected through a connection pipe 65. In the connection pipe 65, an exhaust gas that has passed through a catalyst passage flows. Thus, the connection pipe 65 is a part of a catalyst passage 52. The exhaust gas purifier 100 according to the fifth embodiment includes a compressed air injector (backflow prevention section) 37 instead of the first backflow prevention plate 31 of the first embodiment.

The compressed air injector 37 is disposed in the connection pipe 65 (i.e., at the exhaust downstream side of the first SCR catalyst 25 and the second SCR catalyst 26 in the catalyst passage 52). The compressed air injector 37 injects, toward the exhaust downstream side, compressed air for preventing or reducing a backflow of an exhaust gas from the second exhaust passage 54 to the catalyst passage 52. The compressed air injector 37 injects compressed air such that the compressed air expands radially.

Accordingly, a backflow of an exhaust gas can be prevented or reduced in a wide range in the cross section of the connection pipe 65. In addition, connection to the second exhaust pipe 64 through the connection pipe 65 can reduce the channel cross-sectional area of the catalyst passage 52. Thus, compressed air injected by the compressed air injector 37 can be effectively used. Thus, a backflow of an exhaust gas can be more reliably prevented.

In the fifth embodiment, the compressed air injector 37 is used as the first backflow prevention section. Alternatively, the compressed air injector 37 may be used as the second backflow prevention section. The compressed air injector 37 may be used alone (without any other backflow prevention section). Instead of the connection pipe 65, the compressed air injector 37 may be disposed in the casing 10.

Figure 9:
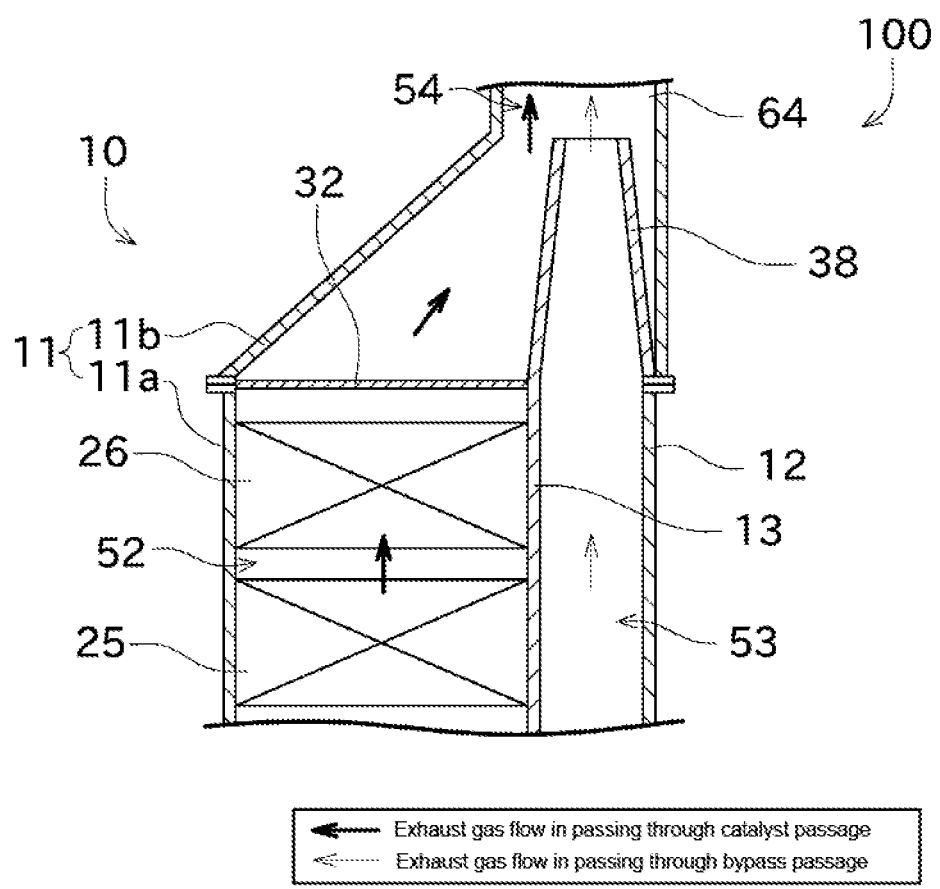
FIG. 9 is a cross-sectional view of a casing according to a sixth embodiment and a vicinity thereof.

Next, a sixth embodiment will be described with reference to FIG. 9. FIG. 9 is a cross-sectional view of a casing 10 according to the sixth embodiment and a vicinity thereof.

An exhaust gas purifier 100 according to the sixth embodiment includes a reduced-diameter section (backflow prevention section) 38 instead of the first backflow prevention plate 31 of the first embodiment. The reduced-diameter section 38 is disposed at an end portion of a bypass passage 53 at the exhaust downstream side.

Specifically, the reduced-diameter section 38 is connected to the bypass passage 53 constituted by a bypass outer wall portion 12 and an inner wall portion 13. The reduced-diameter section 38 has a tapered shape whose channel cross-sectional area gradually decreases toward the exhaust downstream side. This configuration increases the speed of flow of an exhaust gas along the reduced-diameter section 38, and thus, a low-pressure space is formed (Venturi effect). Accordingly, at the exhaust downstream side of the reduced-diameter section 38, a suction flow toward the exhaust downstream side can be produced (ejector effect) so that a backflow of an exhaust gas can be prevented or reduced.

In the sixth embodiment, the reduced-diameter section 38 is sued as the first backflow prevention section. Alternatively, the reduced-diameter section 38 may be used as the second backflow prevention section. The reduced-diameter section 38 may be used alone (without any other backflow prevention section). The reduced-diameter section 38 is not limited to the tapered shape, and may have a stepped shape. That is, the channel cross-sectional area of an end portion of the reduced-diameter section 38 at the exhaust downstream side only needs to be smaller than the channel cross-sectional area of an end portion at the exhaust upstream side, and the difference in the channel cross-sectional area may be set at any degree.

Figure 10A:
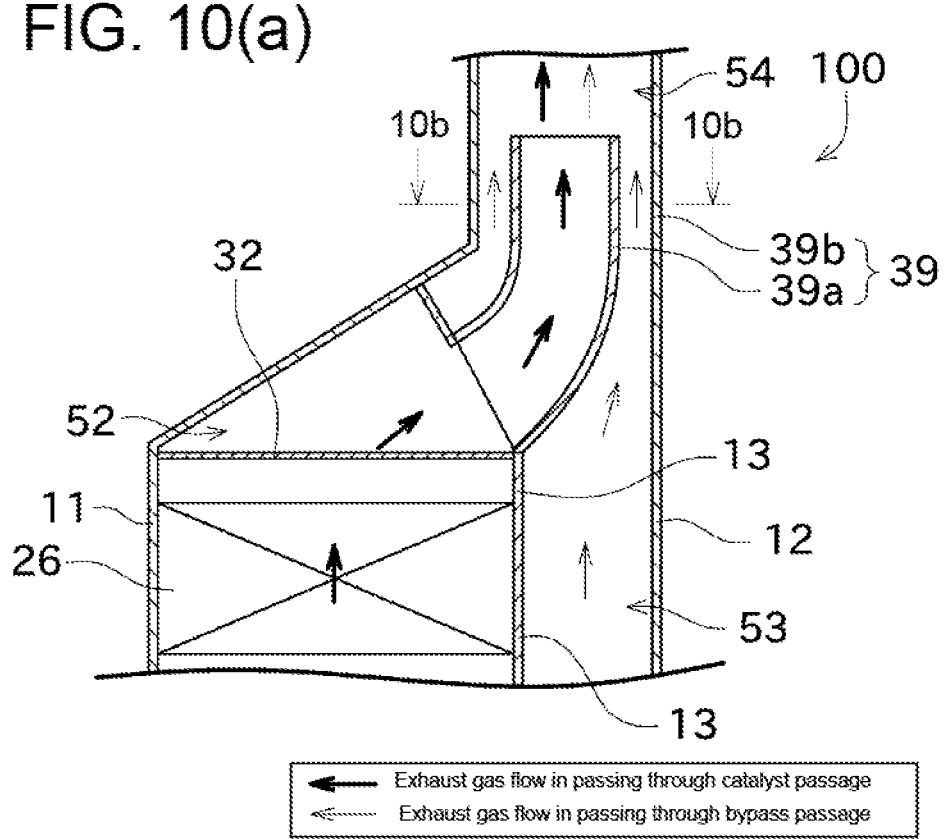
FIG. 10(a) is a cross-sectional view of a casing according to a seventh embodiment and a vicinity thereof.
Figure 10B:
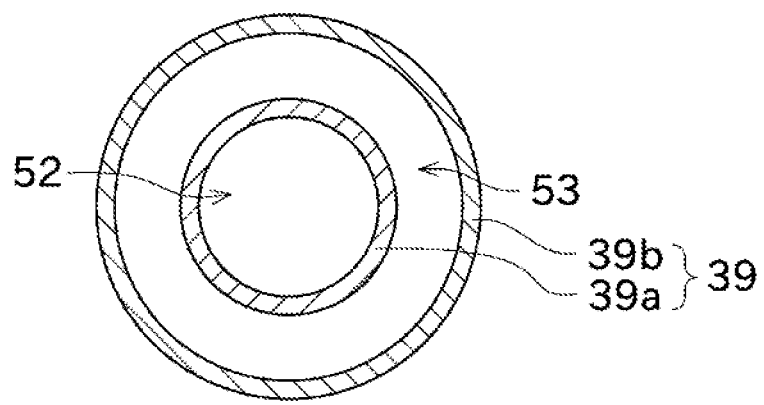
FIG. 10(b) is a cross-sectional view of a double pipe.

Next, a seventh embodiment will be described with reference to FIGS. 10(a) and 10(b). FIG. 10(a) is a cross-sectional view of a vicinity of the casing 10 when seen in a direction perpendicular to a flow of an exhaust gas. FIG. 10(b) is a cross-sectional view of a double pipe (backflow prevention section) 39 when seen in a direction along a flow of an exhaust gas (10b-10b cross-sectional view in FIG. 10(a)).

An exhaust gas purifier 100 according to the seventh embodiment includes a double pipe 39 instead of the first backflow prevention plate 31 of the first embodiment. The double pipe 39 is disposed at portions of the catalyst passage 52 and the bypass passage 53 in the exhaust downstream side.

The double pipe 39 is constituted by an inner tube 39a and an outer tube 39b. The inner tube 39a is disposed at the exhaust downstream side of the catalyst passage 52 constituted by the catalyst outer wall portion 11 and the inner wall portion 13, for example. Thus, the inner tube 39a is a part of the catalyst passage 52. The outer tube 39b covers the outer side of the inner tube 39a. The outer tube 39b is disposed at the exhaust downstream side of the bypass passage 53 constituted by the bypass outer wall portion 12 and the inner wall portion 13, for example. Thus, the outer tube 39b is the bypass passage 53. The inner tube 39a is shorter than the outer tube 39b. Thus, in an end portion of the inner tube 39a at the exhaust downstream side, the catalyst passage 52 and the bypass passage 53 are joined to serve as a second exhaust passage 54.

With this configuration, the exhaust gas flowing in the outer tube 39b (bypass passage 53) does not flow into the inner tube 39a (catalyst passage 52) without a significant change (about 180 degrees) of a traveling passage. In a double pipe, an exhaust gas might flow back from the inner tube 39a through the outer tube 39b in the joint portion. On the other hand, in the configuration described above, since the bypass passage 53 is used as the outer tube 39b, a backflow of an exhaust gas from the bypass passage 53 to the catalyst passage 52 can be more reliably prevented.

In the seventh embodiment, the double pipe 39 is used as the first backflow prevention section. Alternatively, the double pipe 39 may be used as the second backflow prevention section. The double pipe 39 may be used alone (without any other backflow prevention section). In the seventh embodiment, since the axes of the inner tube 39a and the outer tube 39b coincide with each other, the bypass passage 53 is uniformly formed outside the inner tube 39a. However, the axes of the inner tube 39a and the outer tube 39b may not coincide with each other.

Figure 11A:
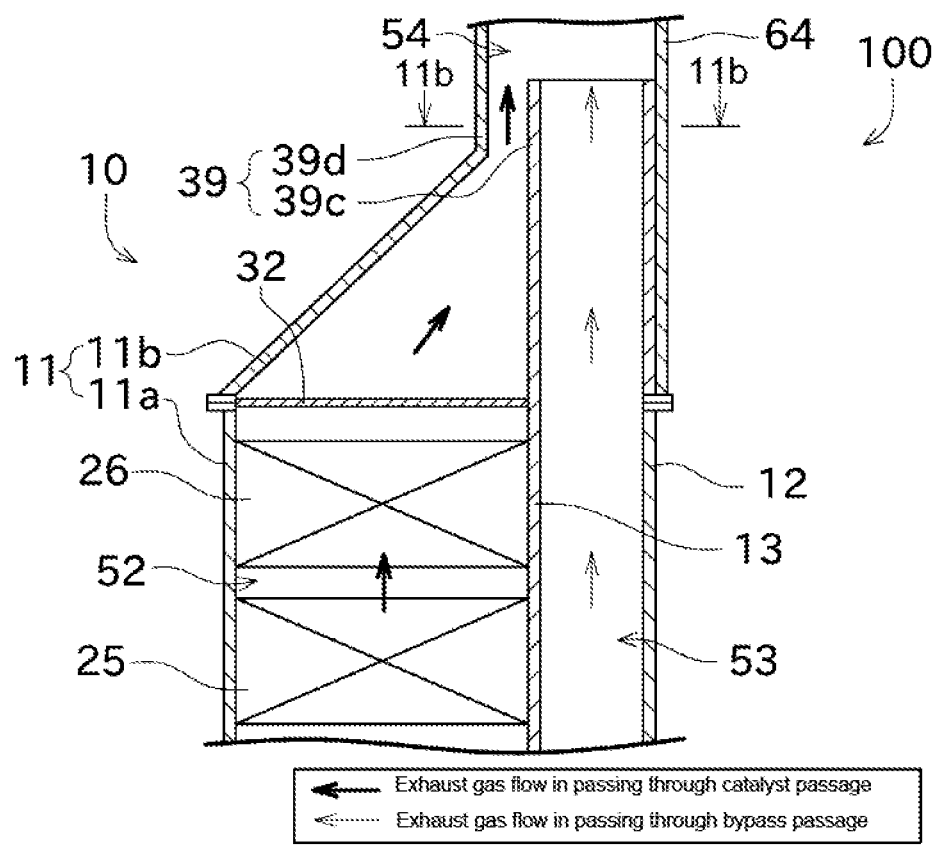
FIG. 11(a) is a cross-sectional view of a casing according to an eighth embodiment and a vicinity thereof.
Figure 11B:
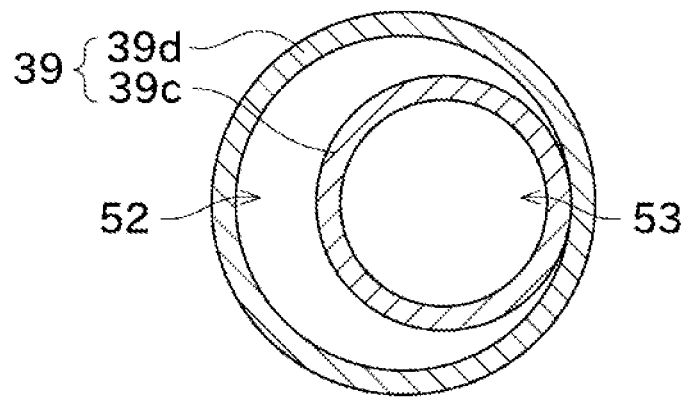
FIG. 11(b) is a cross-sectional view of a double pipe.

Next, an eighth embodiment will be described with reference to FIGS. 11(a) and 11(b). FIG. 11(a) is a cross-sectional view of a vicinity of a casing 10 when seen in a direction perpendicular to a flow of an exhaust gas. FIG. 11(b) is a cross-sectional view of a double pipe (backflow prevention section) 39 when seen in a direction along a flow of an exhaust gas (11b-11b cross-sectional view in FIG. 11(a)).

An exhaust gas purifier 100 according to the eighth embodiment includes a double pipe 39, in a manner similar to the seventh embodiment. It should be noted that in the eighth embodiment, an inner tube 39c of the double pipe 39 serves as a bypass passage 53, and an outer tube 39d serves as a catalyst passage 52. Specifically, the inner tube 39c is disposed at the exhaust downstream side of the bypass passage 53 constituted by the bypass outer wall portion 12 and the inner wall portion 13, for example. The outer tube 39d is disposed at the exhaust downstream side of the catalyst passage 52 constituted by the catalyst outer wall portion 11 and the inner wall portion 13.

In a manner similar to the seventh embodiment, the inner tube 39c is shorter than the outer tube 39d. Thus, in an end portion of the inner tube 39c at the exhaust downstream side, the catalyst passage 52 and the bypass passage 53 are joined to serve as a second exhaust passage 54. With this configuration, the exhaust gas flowing in the inner tube 39c (bypass passage 53) does not flow into the outer tube 39d (catalyst passage 52) without a significant change (about 180 degrees) of a traveling passage.

In the eight embodiment, the double pipe 39 is used as the first backflow prevention section. Alternatively, the double pipe 39 may be used as the second backflow prevention section. The double pipe 39 may be used alone (without any other backflow prevention section). In the eighth embodiment, since the axes of the inner tube 39c and the outer tube 39d do not coincide with each other, the catalyst passage 52 is non-uniformly formed outside the inner tube 39c. However, the axes of the inner tube 39c and the outer tube 39d may coincide with each other.

Figure 12A:
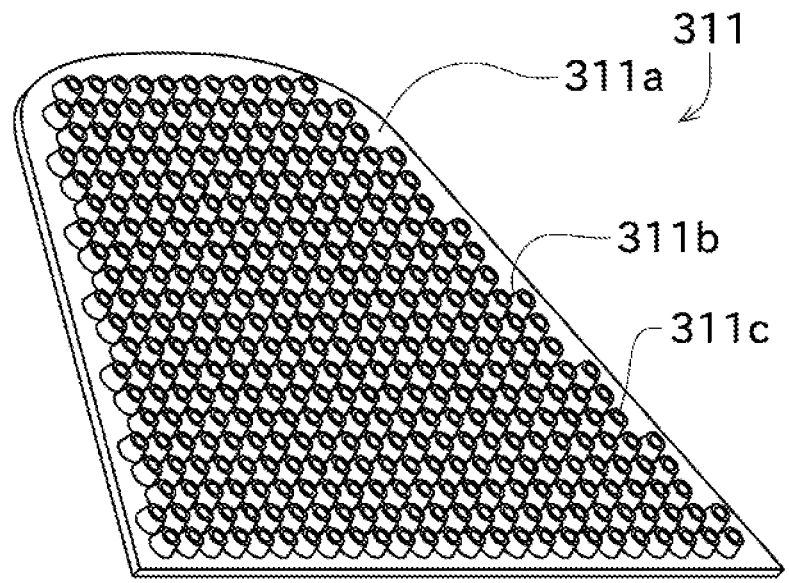
FIG. 12(a) and FIG. 12(b) are a perspective view and a cross-sectional view, respectively, of a first backflow prevention section according to a ninth embodiment.
Figure 12B:
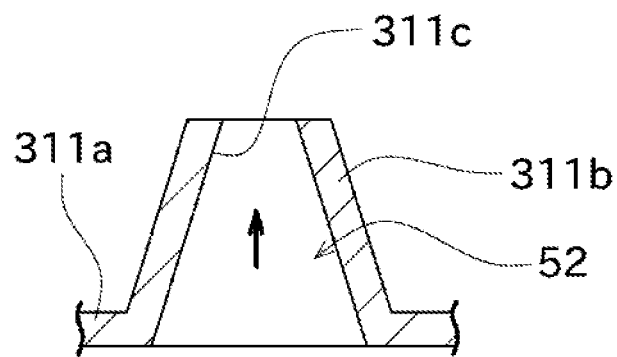

Next, a ninth embodiment will be described with reference to FIGS. 12(a) and 12(b). FIG. 12(a) is a perspective view of a first backflow prevention section 311 of the ninth embodiment. FIG. 12(b) is an enlarged cross-sectional view of the first backflow prevention section 311.

An exhaust gas purifier 100 of the ninth embodiment includes a first backflow prevention section 311 instead of the first backflow prevention plate 31 of the first embodiment. In a manner similar to the first backflow prevention plate 31, the first backflow prevention section 311 connects an end portion of the connection outer wall portion 11b at the exhaust downstream side and an end portion of the inner wall portion 13 at the exhaust downstream side to each other.

As illustrated in FIG. 12(a), the first backflow prevention section 311 includes a base plate 311a. The base plate 311a has a plurality of projections 311b projecting from the base plate 311a to the exhaust downstream side (one way along the normal to the base plate 311a). Each of the projections 311b is a tapered tubular member, and has a reduced-diameter opening (opening) 311c. As illustrated in FIG. 12(b), the reduced-diameter opening 311c has an opening area of an end portion at the exhaust downstream side smaller than an opening area of an end portion at the exhaust upstream side.

With the difference of the opening area described above, the first backflow prevention section 311 can prevent or reduce a backflow of an exhaust gas that has passed through the catalyst passage while allowing the exhaust gas to flow toward the exhaust downstream side. Since the projections 311b project toward the exhaust downstream side, a flow in which an exhaust gas flowing along the base plate 311a enters the reduced-diameter opening 311c and flows toward the second SCR catalyst 26 (backflow) can be prevented or reduced.

The first backflow prevention section 311 is used as the first backflow prevention section in the ninth embodiment, but a similar configuration may be used as the second backflow prevention section. The first backflow prevention section 311 may be used alone (without any other backflow prevention section). An increase in thickness of the base plate 311a allows the reduced-diameter opening 311c to be formed without the projections 311b. In this case, since the projections 311b do not need to be formed, manufacturing costs of the first backflow prevention section 311 can be reduced. All the openings formed in the first backflow prevention section 311 are not necessarily the reduced-diameter openings 311c (the diameter of some openings may be uniform).

As described above, the exhaust gas purifier 100 includes: the first exhaust passage 51 in which an exhaust gas of the power generation engine 8 mounted on the ship 1 flows; the catalyst passage 52 that is a passage branched from the first exhaust passage 51 and used for selective reduction of NOx included in an exhaust gas; the bypass passage 53 that is a passage branched from the first exhaust passage 51 and bypasses the catalyst passage 52; and the second exhaust passage 54 that is a passage in which the catalyst passage 52 and the bypass passage 53 are joined at the exhaust downstream side. The exhaust gas purifier 100 includes the casing 10, the SCR catalysts (the first SCR catalyst 25 and the second SCR catalyst 26), and the two backflow prevention sections (e.g., the first backflow prevention plate 31 and the second backflow prevention plate 32). In the casing 10, at least a part of the catalyst passage 52 and at least a part of the bypass passage 53 are formed. The SCR catalyst is disposed in the catalyst passage 52, and selectively reduces NOx included in an exhaust gas flowing in the catalyst passage 52. The first backflow prevention section prevents or reduces a backflow of an exhaust gas from the second exhaust passage 54 to the catalyst passage 52. The second backflow prevention section is disposed between the SCR catalyst and the first backflow prevention section, and prevents or reduces a backflow of an exhaust gas.

Accordingly, since two backflow prevention sections are disposed, a backflow of an exhaust gas from the second exhaust passage to the catalyst passage can be more reliably prevented or reduced. Consequently, an exhaust gas that has flowed back does not easily flows into the SCR catalyst so that degradation of the SCR catalysts can be suppressed.

The foregoing description is directed to the preferred embodiments of the present invention, and the configurations described above may be changed, for example, as follows.

In the embodiments described above, the two catalysts of the first SCR catalyst 25 and the second SCR catalyst 26 are used as the SCR catalysts. Alternatively, one SCR catalyst may be used, or three or more SCR catalysts may be used. A material except for urea water may be used as a reducing agent.

The configurations of the first exhaust passage 51, the catalyst passage 52, the bypass passage 53, and the second exhaust passage 54 of the embodiments described above are merely examples, and may be changed. For example, the catalyst passage pipe 62 and the bypass passage pipe 63 may be disposed in the casing 10. The casing 10 may include the first exhaust passage 51 or the second exhaust passage 54.

In the embodiments, two backflow prevention sections are provided, but three or more backflow prevention sections may be provided. Features described in the first through ninth embodiments may be combined as appropriate. For example, any two or three, or more, of the backflow prevention sections described in the first through ninth embodiments may be used in combination. The pipe configuration using the connection pipe 65 of the fifth embodiment may be applied to another embodiment. The configuration of the first embodiment in which the opening ratio is changed depending on the location may be applied to the first backflow prevention section 311 of the ninth embodiment.

The backflow prevention sections of the foregoing embodiments are examples, and another configuration may be employed as long as the configuration prevents or reduces a backflow of an exhaust gas from the second exhaust passage 54 to the catalyst passage 52. For example, in a manner similar to the catalyst passage valve 21, for example, the configuration may switch the catalyst passage 52 between open and close.

REFERENCE SIGNS LIST 10 casing
23 urea water injector (reducing agent injector)
25 first SCR catalyst (SCR catalyst)
26 second SCR catalyst (SCR catalyst)
31 first backflow prevention plate (backflow prevention section, first backflow prevention section)
311 first backflow prevention section (backflow prevention section)
32 second backflow prevention plate (backflow prevention section, second backflow prevention section)
33 anti-backflow catalyst (backflow prevention section)
34 catalyst passage inner pipe (backflow prevention section)
36 anti-backflow guide section (backflow prevention section)
37 compressed air injector (backflow prevention section)
38 reduced-diameter section (backflow prevention section)
39 double pipe (backflow prevention section)
51 first exhaust passage
52 catalyst passage
53 bypass passage
54 second exhaust passage
100 exhaust gas purifier

The invention claimed is:

1. An exhaust gas purifier comprising:
a first exhaust passage in which an exhaust gas of an engine mounted on a ship is configured to flow;
a catalyst passage that is branched from the first exhaust passage and is configured to selectively reduce a nitrogen oxide included in the exhaust gas;
a bypass passage that is branched from the first exhaust passage and bypasses the catalyst passage;
a second exhaust passage in which the catalyst passage and the bypass passage are joined at an exhaust downstream side;
a casing in which at least a part of the catalyst passage and at least a part of the bypass passage are formed;
a selective catalytic reduction (SCR) catalyst that is disposed in the catalyst passage and is configured to selectively reduce a nitrogen oxide included in an exhaust gas flowing in the catalyst passage; and
a backflow prevention section configured to prevent or reduce a backflow of an exhaust gas from the second exhaust passage to the catalyst passage, the backflow prevention section including:
a first backflow prevention section positioned between the catalyst passage and the bypass passage; and
a second backflow prevention section positioned between the SCR catalyst and the first backflow prevention section.

2. The exhaust gas purifier according to claim 1, wherein:
the casing includes an inner wall portion separating the catalyst passage and the bypass passage from each other, and a catalyst outer wall portion separating the catalyst passage and outside from each other;
at least one of the first backflow prevention section and the second backflow prevention section is disposed to connect the inner wall portion and the catalyst outer wall portion to each other and partially has an opening; and
an opening ratio in the catalyst outer wall portion is smaller than an opening ratio in the inner wall portion.

3. The exhaust gas purifier according to claim 1, further comprising:
a reducing agent injector that is disposed closer to an exhaust upstream side than the SCR catalyst is in the catalyst passage and is configured to inject a reducing agent for use in the selective reduction of a nitrogen oxide included in the exhaust gas toward an exhaust downstream side together with compressed air, and
the reducing agent injector is configured to inject compressed air in any of a case where the exhaust gas passes through the catalyst passage and in a case where the exhaust gas passes through the bypass passage.

4. The exhaust gas purifier according to claim 1, wherein at least one of the first backflow prevention section and the second backflow prevention section is a catalyst for preventing or reducing a backflow.

5. The exhaust gas purifier according to claim 1, wherein at least one of the first backflow prevention section and the second backflow prevention section is a catalyst passage inner pipe that is disposed in the catalyst passage and is configured to reduce a channel cross-sectional area of the exhaust gas that has passed through the SCR catalyst.

6. The exhaust gas purifier according to claim 1, wherein:
the bypass passage has a passage connection opening through which the bypass passage and the catalyst passage are connected to each other to serve as the second exhaust passage, and
the backflow prevention section is disposed at least at an edge of the passage connection opening at an exhaust upstream side and is an anti-backflow guide section that is configured to guide the exhaust gas flowing in the bypass passage such that the exhaust gas is prevented from entering the passage connection opening.

7. The exhaust gas purifier according to claim 1, wherein the backflow prevention section is a compressed air injector that is disposed closer to an exhaust downstream side than the SCR catalyst is in the catalyst passage and is configured to inject, toward the exhaust downstream side, compressed air for preventing or reducing a backflow of an exhaust gas from the second exhaust passage to the catalyst passage.

8. The exhaust gas purifier according to claim 1, wherein:
the backflow prevention section is a reduced-diameter section that is formed in an end portion of the bypass passage at an exhaust downstream side and is configured to prevent or reduce a backflow of an exhaust gas from the second exhaust passage to the catalyst passage, and
a channel cross-sectional area of an end portion of the reduced-diameter section at the exhaust downstream side is smaller than a channel cross-sectional area of an end portion of the reduced-diameter section at an exhaust upstream side thereof.

9. The exhaust gas purifier according to claim 1, wherein:
the backflow prevention section is a double pipe that is disposed at end portions of the catalyst passage and the bypass passage at an exhaust downstream side and is configured to prevent or reduce a backflow of an exhaust gas from the second exhaust passage to the catalyst passage,
the catalyst passage is an inner tube, and
the bypass passage is an outer tube covering an outer side of the inner tube.

10. The exhaust gas purifier according to claim 1, wherein:
the backflow prevention section is a double pipe that is disposed at end portions of the catalyst passage and the bypass passage at an exhaust downstream side and is configured to prevent or reduce a backflow of an exhaust gas from the second exhaust passage to the catalyst passage,
the bypass passage is an inner tube, and
the catalyst passage is an outer tube covering an outer side of the inner tube.

11. The exhaust gas purifier according to claim 1, wherein:
the casing includes an inner wall portion separating the catalyst passage and the bypass passage from each other, and a catalyst outer wall portion separating the catalyst passage and outside from each other;
the backflow prevention section is disposed to connect the inner wall portion and the catalyst outer wall portion to each other and partially has an opening; and
in at least a part of the opening, an opening area of an end portion at an exhaust downstream side is smaller than an opening area of an end portion at an exhaust upstream side.

12. The exhaust gas purifier according to claim 1, wherein the backflow prevention section comprises three or more backflow prevention sections.

13. The exhaust gas purifier according to claim 1, wherein:
the casing includes a first portion that defines at least a portion of the bypass passage;
the bypass passage is interposed between the first portion of the casing and the catalyst passage; and
the casing includes a second portion that defines at least a portion of the second exhaust passage, the second portion of the casing positioned such that the second portion of the casing overlaps a region defined by the first portion of the casing.

14. An apparatus comprising:
an outer casing having a first end and a second end opposite the first end, the outer casing defining a cavity;
an inner wall including a first surface and a second surface opposite the first surface, the inner wall disposed within the cavity and extending from the first end to the second end in an exhaust gas moving direction to define:
a first path defined by a first portion of the outer casing and the first surface of the inner wall, wherein a catalyst is configured to be positioned at a location within the first path; and
a second path defined by a second portion of the outer casing and the second surface of the inner wall;
a first backflow prevention section positioned between the first path and the second path; and
a second backflow prevention section positioned between the location and the first backflow prevention section.

15. The apparatus according to claim 14, further comprising:
an outflow port coupled to the second end of the outer casing, the outflow port in communication with the first path and the second path; and
wherein the outflow port is defined by a third portion of the outer casing, the third portion of the outer casing positioned such that the third portion of the outer casing overlaps a region defined by the second portion of the outer casing.

16. The apparatus according to claim 14, further comprising:
the catalyst positioned at the location; or
one or more inlets positioned at the first end of the outer casing; and
wherein the one or more inlets are coupled to and in communication with an inlet port, the inlet port configured to receive the exhaust gas.

17. The apparatus according to claim 14, wherein the second backflow prevention section extends from the inner wall to the first portion of the outer casing.

* * * * *